United States Patent [19]
Connors et al.

[11] Patent Number: 5,132,980
[45] Date of Patent: Jul. 21, 1992

[54] METHOD AND DEVICE FOR PRECONDITIONING A LASER HAVING A SOLID STATE GAIN MEDIUM

[75] Inventors: Kevin P. Connors, Sunnyvale, Calif.; Gerald M. Mitchell; J. Michael Yarborough, both of Tuscon, Ariz.; Michael L. Krupp, San Rafael, Calif.

[73] Assignee: Coherent, Inc., Palo Alto, Calif.

[21] Appl. No.: 705,505

[22] Filed: May 24, 1991

Related U.S. Application Data

[63] Continuation-in-part of Ser. No. 654,834, Feb. 13, 1991, abandoned.

[51] Int. Cl.[5] .............................................. H01S 3/00
[52] U.S. Cl. ...................................... 372/33; 372/69; 372/101
[58] Field of Search .................. 372/33, 69, 98, 101

[56] References Cited

U.S. PATENT DOCUMENTS 4,021,754  5/1977  Colao ............................. 372/33
5,001,718  3/1991  Burrows et al. ................. 372/101

Primary Examiner—Leon Scott, Jr.
Attorney, Agent, or Firm—Limbach & Limbach

[57] ABSTRACT

A method and device for preventing premature optics burn-out in a laser having a solid gain medium is provided. The invention involves preheating the gain medium by supplying power at a level which is sufficient to set up a thermal lens, yet insufficient to cause substantial production of laser light. In one approach, a simmer routine is overlaid on a ramp routine, so that the power supplied to the gain medium is gradually increased during the warm-up period.

33 Claims, 3 Drawing Sheets

METHOD AND DEVICE FOR PRECONDITIONING A LASER HAVING A SOLID STATE GAIN MEDIUM

This application is a continuation-in-part application of co-pending application Ser. No. 07/654,834 was filed Feb. 13, 1991 entitled Method and Device for Preconditioning a Laser Having a Solid State Gain Medium.

FIELD OF THE INVENTION

This invention relates to solid state lasers employing stable resonators. In particular, the invention involves a method for preconditioning a solid gain medium so as to avoid start up damage to the intra-cavity optics including the gain medium.

BACKGROUND OF THE INVENTION

Many lasers used in today's markets employ solid state gain mediums. These mediums can be made of a number of materials, doped with a variety of elements. One of the less desirable properties of these materials is that they tend to form thermal lenses when pumped. The thermal lens is brought about by the fact that in general all of the light used to pump the medium is not absorbed directly into the pump bands therefore a considerable amount of energy is released to the lattice by non-radiative decay leading to heat. The lens can either be positive or negative depending upon whether the medium has a positive or negative $dn/dT$, where n is the idex or refraction and T is the temperature. Most of the more common materials used today have a positive $dn/dT$ thus when thermal equilibrium is established the medium will act as a positive lens with predictable characteristics and can be used as a stable element of a laser cavity.

The behavior of the laser during the build up to steady state of the thermal lens can cause problems affecting the intra-cavity optics. With the initial pump pulse from the flashlamps a larger portion of the pump light is absorbed at the surface of the rod than at the center. This will cause the rod to behave initially as a negative lens. Depending on the strength of this lens and the power of the resonator optics the resonator may become initially unstable. Successive pump pulses will continue to heat the rod until a steady state condition arises where the heat flow from the rod will be from the center, thereby reversing the previous condition and forming the stable positive lens. This process can take several seconds thus the initial laser pulses will be continually evolving until the steady state is reached. Holtz, R.F., Thermal Transient Effects in Repetitively Pulsed Flashlamp-Pumped YAG:Nd and YAG:Nd, Lu Laser Material, Applied Optics, Vol. 12, No. 8, (August 1973). If the resonator is unstable during the initial pumping, the rays propagating back and forth between the resonators mirrors will walk out of the cavity, as shown in FIG. 1. The rays will be limited ultimately by some aperture in the laser (possibly the gain medium itself). Diffraction within the resonator will exhibit characteristic Fresnel diffraction effects, the outcome of which can lead to on axis intensity peaks that can be four times the intensity in the limiting aperture. Siegman, A.E., Unstable Optical Resonators, Applied Optics, Vol. —, No. 2, (February 1974). The amplification of these peaks with successive passes through the gain medium can often lead to coating damage to any of the intra-cavity optics. These damage sites need not always be located on the mechanical axis of the resonator. Only in a perfectly aligned resonator with no aberrations will they appear at the mechanical axis. Under these conditions the optic axis is coincident with the mechanical axis. With phase tilt, astigmatic, and higher order aberrations present these damage sites need not be confined to the mechanical axis.

One approach to solving these problems has been to use an intracavity shutter, which blocks the intracavity optical path while the gain medium is pumped to its hot equilibrium condition. Once the thermal lens is formed, the intracavity shutter is opened and the gain medium lases with no undesirable transitional optical scheme. One problem with this approach is that it is undesirable to accessorize the laser with moving parts which create the potential for mechanical failure. Another problem with the intracavity shutter is that laser intracavity space is frequently limited. Thus, it is desirable, if not necessary, to solve the problem without adding additional physical elements to the intracavity space.

Another approach to the problem is to increase the damage threshold of the coatings at the faces of the gain medium. However, this approach only slightly extends the life of the coating without solving the underlying problem. The coating still becomes damaged, causing the coating to fail prematurely.

Therefore, it is an object of this invention to allow a solid state gain medium to come to thermal equilibrium prior to laser emission, thereby avoiding the negative effects of Fresnel diffraction brought about by operation of the laser in an unstable resonator condition.

Other related objects of the invention are to accomplish the objective stated above without using moving parts and without encroaching on or affecting intracavity space.

Another object of the invention is to bring the laser gain medium to thermal equilibrium in accordance with the above objectives, as rapidly as possible.

SUMMARY OF THE INVENTION

The invention provides a method for preconditioning a laser having a solid state gain medium, which tends to form a stable thermal lens when heated to a normal operating state, i.e., thermal equilibrium. The method involves supplying a sufficient amount of energy to the gain medium, so that a stable thermal lens is set up prior to supplying enough energy to produce any substantial amount of laser light. By performing such a preconditioning technique, the initial damage to the optics caused by operation in the unstable resonator regime is avoided.

The invention also involves a laser device which includes a solid state gain medium, and a means for pre-heating the gain medium in accordance with the method set forth above. For example, in one embodiment two computer driven flash routines are overlaid so as to limit the initial energy output from the flashlamps. One routine, referred to as a "simmer" routine, comprises a series of relatively low intensity flashes. The other routine, referred to as a "ramp" routine, comprises a series of flashes of gradually increasing intensity.

DETAILED DESCRIPTION OF THE PREFERRED EMBODIMENTS

Lasers which employ solid state gain mediums are susceptible to sustaining optics damage during the initial heat-up phase after the laser is first turned on. This is particularly true when gain medium materials are used which tend to form thermal lenses. Such materials exhibit an increase in their index of refraction (n) as their temperature (T) is increased, i.e. a positive dn/dt. The thermal lens is analogous to an optical lens in that it will tend to focus a beam of light, thereby increasing its intensity.

Figure 2:
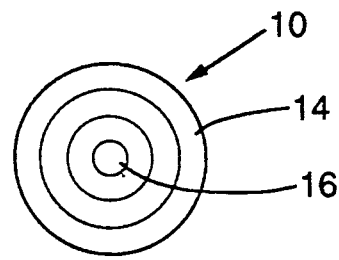
FIG. 2 is a sectional view of a solid state gain medium at a thermal equilibrium which is typically maintained during the laser's normal operating state.
Figure 3:
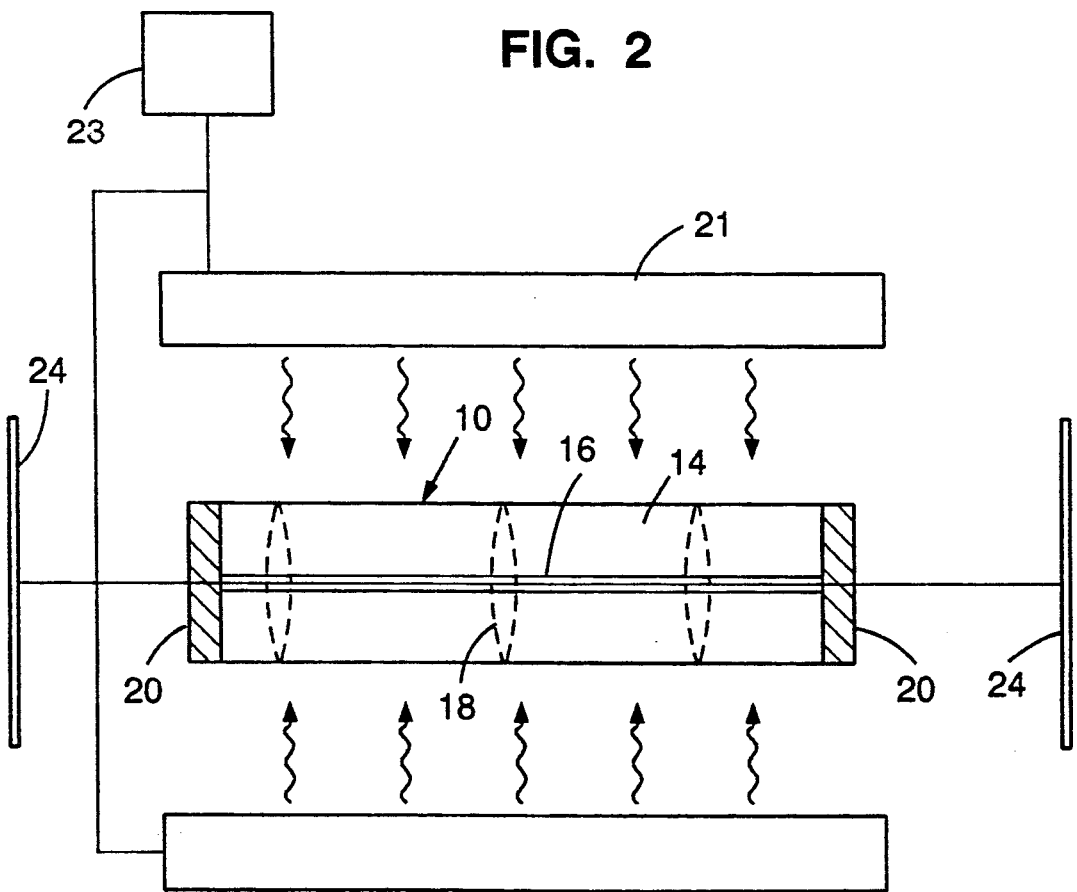
FIG. 3 is a side sectional schematic diagram of a laser of the present invention, illustrating the thermal lens which is typically maintained during the laser's normal operating state.

Once the gain medium is heated up to its normal operating state, a relatively stable thermal gradient exists between the medium's core and outer surface. Since the exterior of the gain medium is usually associated with a coolant, the core of the gain medium tends to be hotter than the exterior. Therefore, the index of refraction tends to be greatest near the core of the gain medium, and gradually decreases in accordance with the thermal gradient. As discussed below, FIGS. 2 and 3 illustrate this effect in a rod-shaped gain medium.

Before the gain medium reaches thermal equilibrium, Fresnel diffraction effects lead to intensity peaks that on successive passes through the gain medium can be amplified to powers in excess of the damage threshold of the intra-cavity optics.

In the present invention, advantage is taken of the fact that a minimum amount of power (PL) must be supplied to the gain medium in order to produce any significant amount of laser light. In addition, the stable thermal lens, as shown in FIG. 3, can be set up by supplying power to the gain medium which is less than PL. Once the stable positive thermal lens is established the intra-cavity beam intensity profile is dominated by stable cavity modes, replacing the diffractive modes that are prevalent during the formation of the positive lens. Thus by preliminarily supplying power to the gain medium at a level less than PL, yet at an amount which is sufficient to set up the stable thermal lens, the formation of hot spots is minimized and start-up damage to the laser optics is substantially prevented.

Throughout the specification reference is made to the "power" which is supplied to the gain medium. "Power" is defined as energy/time=Watts=Joules/second. Reference is also made to "minimum lasing energy", which is defined as the amount of energy which must be supplied to the gain medium in order to produce any substantial amount of laser light. "Minimum lasing power" is sometimes abbreviated "PL", and is defined as the minimum lasing energy divided by time.

In the embodiments described below, a rod-shaped gain medium is used for illustrative purposes. However, the rod is only one type of solid gain medium to which the present invention applies. The invention also applies to gain mediums of other shapes, which tend to exhibit the thermal lens effect.

Figure 1:
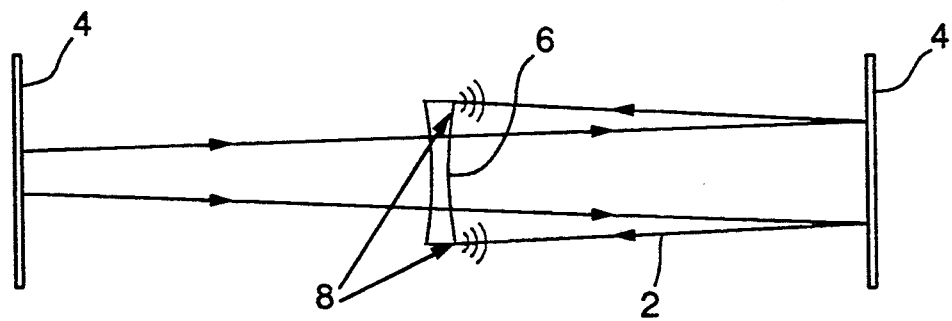
FIG. 1 is ray trace showing the rays walking out of the cavity due to the formation of the negative lens in the rod with initial pumping by the flashlamps.

FIG. 1 is a ray trace showing the rays 2 reflecting off of resonator mirrors 4 and walking out of the laser cavity due to the formation of a negative lens in the rod 6 with initial pumping by the flashlamps (not shown). The rays 2 are diffracted at the rod's aperture edges 8. The thermal lens is transient until thermal equilibrium is reached. Under these conditions diffraction will have the dominant effect on the intensity profile of the laser beam.

FIG. 2 shows a cross-section of the rod 10 after it has reached thermal equilibrium. In this state the outer portion 14 of the rod 10 is cooler than its core 16 forming a thermal gradient along the radius of the rod.

The stable thermal lens is best illustrated in FIG. 3, which shows a schematic diagram of a laser which has reached thermal equilibrium. The rod 10 is hotter in its core 16 relative to its outer portion 14. Therefore, light which passes through the central portion of the rod is focused more than light which passes through the outer portion, resulting in a thermal lens 18 throughout the length of the rod.

The ends of the rod 10 have anti-reflective coatings 20 which are selected to maximize the transmission of light into and out of the rod.

As shown in FIG. 3, two flashlamps 21 are arranged on opposite sides of the rod 10. The flashlamps 23 are connected to a controller 23 which allows a programmer to control the intensity and frequency of flashlamp flashes, which directly affects the amount of power supplied to the gain medium. Resonator mirrors 24 are positioned near opposing ends of the laser rod 10.

Figure 4:
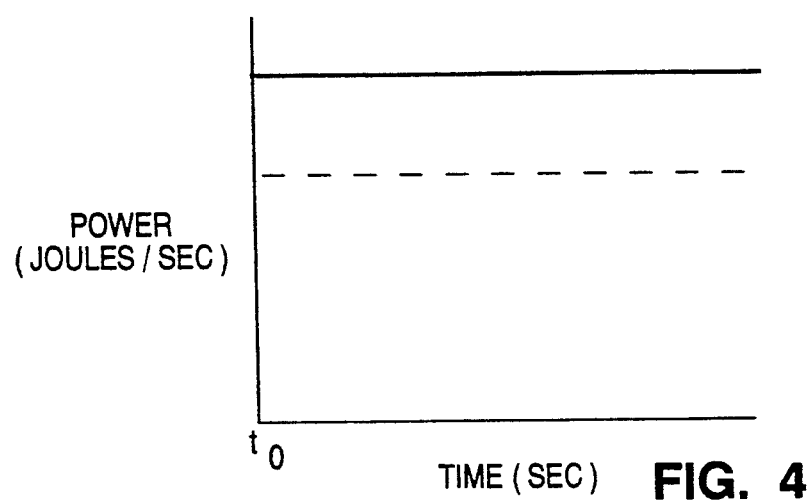
FIG. 4 is a graphical diagram showing the relative power supplied to the gain medium in a prior art laser device.

In a prior art laser device, flashlamps are used to energize the gain medium, by supplying full power to the gain medium from $t_o$, the time the laser is initially turned on. In other words, from the time the laser device is switched on, the flashlamps supply a relatively constant amount of power to the rod, which exceeds the minimum lasing power (PL). This type of power supply routine is shown in FIG. 4, in which the power 33 supplied to the rod exceeds the minimum power 32 required to produce laser light.

Figure 5:
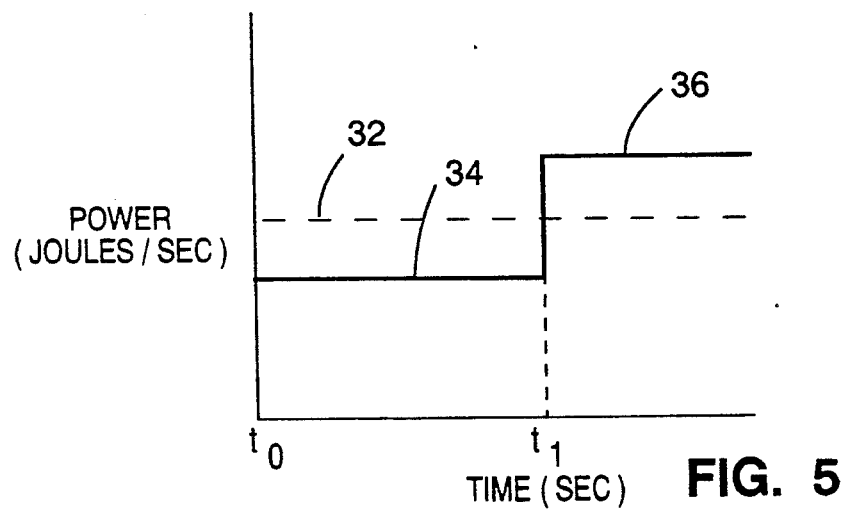
FIG. 5 is a graphical diagram showing the relative power supplied to the gain medium in a first embodiment of the present invention.
Figure 6:
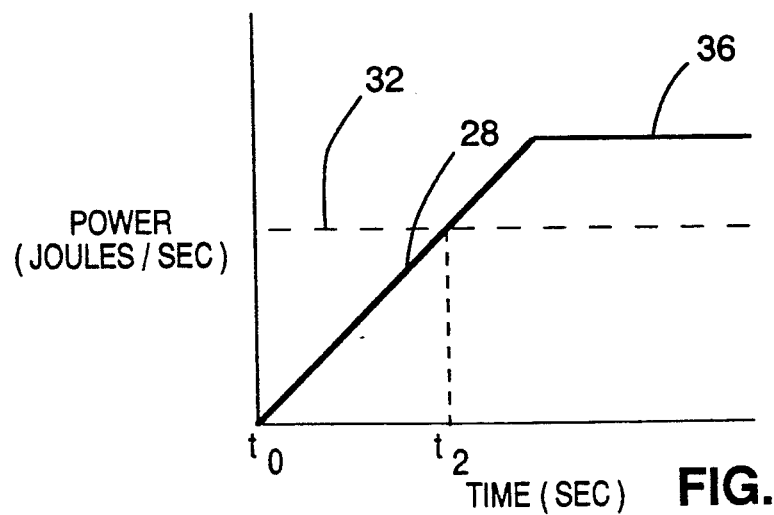
FIG. 6 is a graphical diagram showing the relative power supplied to the gain medium in a second embodiment of the present invention.

In contrast, FIGS. 5 and 6 show two different generalized start-up routines of the present invention. A first embodiment of the present invention is illustrated in FIG. 5, in which the flashlamps initially supply power 34 to the gain medium which is less than PL 32, over a warm-up period of $t_1$. For example, the initial power output of the flashlamps could be as high as approximately 90% of PL. Initial power output 34 is relatively constant, and is referred to as a "simmer" routine. Power level 34 is sufficient to substantially set up the stable thermal lens shown in FIG. 3. Once the rod has reached thermal equilibrium, the power output 36 of the flashlamps is increased above PL allowing the device to produce the desired laser wavelengths. The general start-up routine shown in FIG. 5 substantially prevents the formation of hot spots in the gain medium, thus minimizing or eliminating the type of optical coating burn problems typically observed when starting up prior art lasers.

FIG. 6 illustrates a second start-up routine embodiment of the present invention. In this embodiment the flashlamps start by supplying relatively low power to the rod. The power output 38 is gradually increased up to normal operating power 36. This "ramp" function can be accomplished by either increasing the intensity or the frequency of the flashes. Similar to the example shown in FIG. 5, the initial power output is low enough to allow the rod to thermally equilibrate during a warm-up period of $t_2$, prior to lasing.

Figure 7:
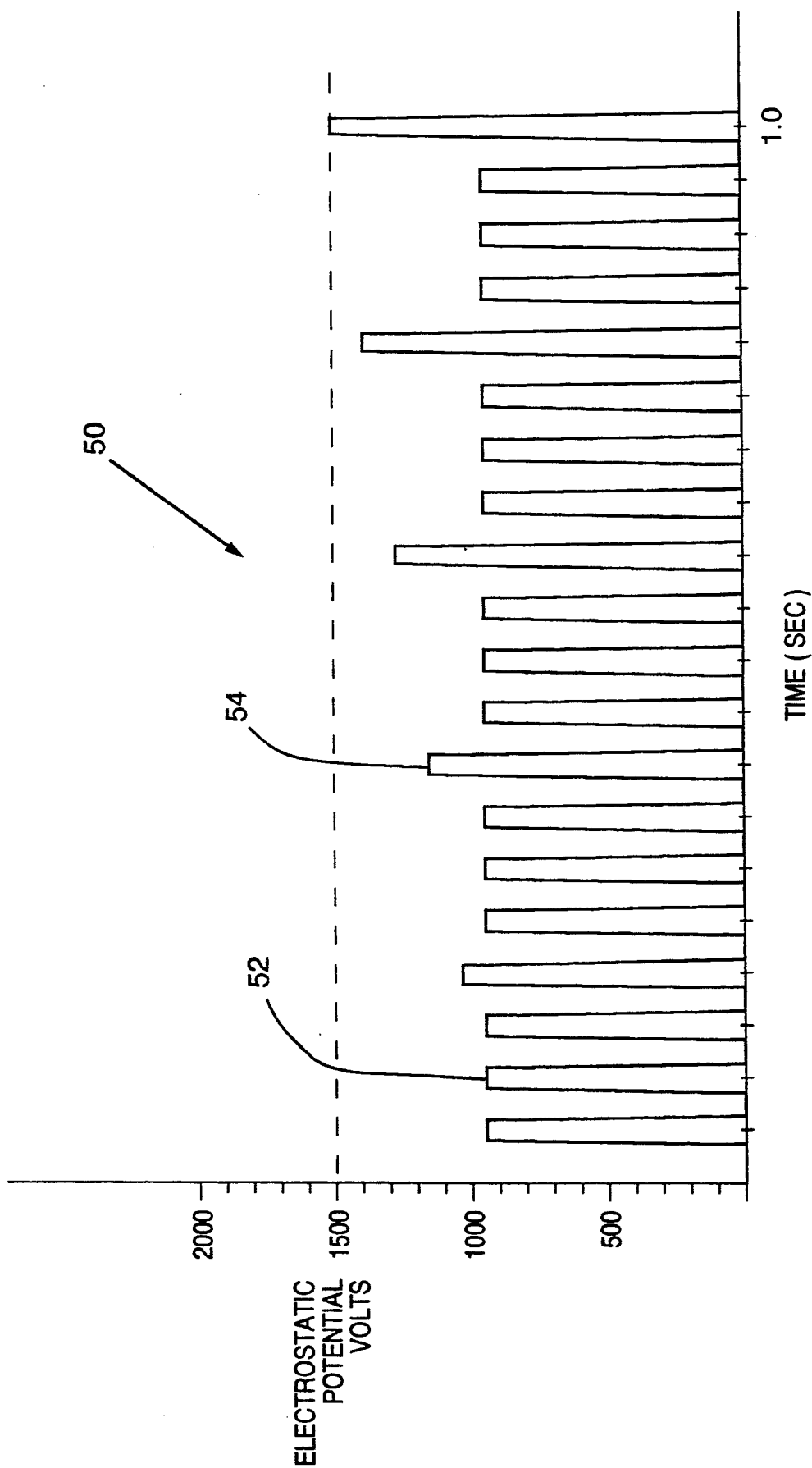
FIG. 7 is a graphical diagram illustrating two overlaid flash routines employed in a third embodiment of the present invention.

FIG. 7 shows a third embodiment of the present invention, in which a combination of the simmer and ramp routines discussed above, are employed. Such a combination is useful for preconditioning, for example, a Holmium(Ho):YAG rod. An example of such a rod is available from Union Carbide, and has dopant concentrations of 0.36% Holmium, 1.00% Chromium and 5.76 Thulium. Another example of a rod useful in this embodiment is available from Litton Airtron, and has 0.36% Holmium, 0.80% Chromium and 5.76% Thulium. The invention is also useful for preconditioning Neodymium(Nd):YAG rods.

The laser used in the third embodiment is shown in FIG. 3. As discussed above, it includes a rod 10 which is equipped with two flashlamps 21 positioned on opposite sides of the rod. Preferably, the laser also has reflectors (not shown) arranged in a dual elliptical configuration. The power output of the flashlamps is controlled by adjusting the electrostatic potential supplied to the flashlamps, which directly affects flash intensity. This adjustment is performed by programing the controller 23 to vary the flash routine. In the third embodiment the simmer routine control means, for example software, directs the flashlamp to flash twenty times per second generating the simmer routine flash profile 52.

Approximately 900 Volts are supplied to the flashlamps to produce the simmer routine flashes. At twenty cycles per second, a minimum of approximately 1050 Volts would have to be supplied to the rod to produce substantial laser light. Therefore, the simmer routine substantially heats the rod without producing laser generating hot spots.

Additionally, a ramp routine 54 is overlaid on top of the simmer routine. The ramp routine control means, for example software, drives the flashlamps to flash five times per second. The voltage supplied to the flashlamps for the ramp routine begins at approximately 900 Volts, and gradually increases up to approximately 1500 Volts, which is the normal operating voltage of the laser.

Preferably, the combined simmer and ramp routines used in the third embodiment are carried out by synchronizing the two flashlamps, so that each flashlamp executes both the simmer and flash routines. However, a similar result could be accomplished by employing different flashlamps for different routines. For example, different flashlamps could be used for pre-heating, while other flashlamps could be used for lasing.

Those skilled in the art will appreciate that numerous variations of the specific embodiments set forth above may be practiced without departing from the spirit of the invention, as claimed in the following claims.

We claim:

1. A method of preconditioning a laser having a solid state gain medium which forms a stable thermal lens when heated to a normal operating state, comprising the step of:
supplying power to the gain medium which is sufficient to heat the gain medium up to thermal equilibrium and insufficient to produce substantial laser light.

2. A method of preconditioning a laser having a solid state gain medium which forms a stable thermal lens when heated to a normal operating state, comprising the steps of:
supplying power to the gain medium which is sufficient to set up the thermal lens and insufficient to produce substantial laser light; and
increasing the power supplied to the gain medium until the gain medium reaches its normal operating state.

3. The method of claim 2, wherein the increasing step is performed after the thermal lens has substantially formed.

4. The method of claim 3, wherein the increasing step is performed instantaneously.

5. The method of claim 2, wherein the increasing step is performed gradually.

6. The method of claim 5, wherein the supplying step is performed substantially simultaneously with the increasing step.

7. A method of preconditioning a laser having a solid state gain medium which forms a stable thermal lens when heated to a normal operating state, comprising the step of:
supplying power to the gain medium, which is sufficient to set up the thermal lens, and insufficient to produce laser damage to the optical coatings while the thermal lens is forming.

8. A method of preconditioning a laser having a solid state gain medium which forms a thermal lens when heated, comprising the step of:
supplying energy to the gain medium during a warm-up period, wherein the amount of energy supplied during the warm-up period is sufficient to set up the stable thermal lens, yet insufficient to produce substantial laser light.

9. The method of claim 8, wherein the energy is supplied by flashing at least one flashlamp on the gain medium.

10. The method of claim 9, wherein the energy supplying step includes a simmer routine which directs the flashlamp to supply a substantially constant amount of energy to the gain medium during the warm-up period.

11. The method of claim 9, wherein the energy supplying step includes a ramp routine which directs the flashlamp to supply a gradually increasing amount of energy to the gain medium during the warm-up period.

12. The method of claim 11, wherein the ramp routine includes a series of flashes of substantially constant intensity and gradually increasing frequency.

13. The method of claim 12, wherein the energy supplying step further includes a simmer routine comprised of a series of flashes producing a substantially constant power output which is less than minimum lasing power.

14. The method of claim 13, wherein the ramp routine and the simmer routine are overlaid.

15. The method of claim 11, wherein the ramp routine includes a series of flashes of substantially constant frequency and gradually increasing intensity.

16. The method of claim 15, wherein the energy supplying step further includes a simmer routine comprised of a series of flashes producing a substantially constant power output which is less than minimum lasing power.

17. The method of claim 16, wherein the ramp routine and the simmer routine are overlaid.

18. A method of pre-conditioning a laser having a coated solid gain medium which forms a thermal lens when heated to a normal operating state, comprising the step of:
gradually heating the gain medium such that less than minimum lasing power is initially supplied to the gain medium, allowing the thermal lens to form prior to producing substantial laser light, whereby start-up damage to the gain medium coating is prevented.

19. The method of claim 18, wherein the power initially supplied to the gain medium is gradually increased.

20. The method of claim 19, wherein the heating is performed by flashing a flashlamp on the gain medium.

21. The method of claim 20, wherein said heating step includes a ramping routine comprising a series of flashes of substantially constant frequency and gradually increasing intensity.

22. The method of claim 21, wherein the heating step further includes a simmer routine overlaid on the ramp routine.

23. The method of claim 20, wherein said heating step includes a ramping routine comprising a series of flashes of substantially constant intensity and gradually increasing frequency.

24. The method of claim 18, wherein the power initially supplied to the gain medium is substantially constant.

25. A laser comprising:
a solid gain medium which forms a stable thermal lens when heated to a normal operating state;
means for supplying the gain medium with sufficient power to form the thermal lens yet insufficient to cause substantial emission of laser wavelengths; and
control means for adjusting the supplying means to provide sufficient power to the gain medium to produce substantial laser wavelengths.

26. The laser of claim 25, wherein the supplying means includes a flashlamp for energizing the gain medium.

27. The laser of claim 26, wherein the supplying means includes a ramp routine comprising a series of flashes of substantially constant intensity and gradually increasing frequency.

28. The method of claim 27, wherein the heating step further includes a simmer routine overlaid on the ramp routine.

29. The laser of claim 27, wherein the supplying means further includes a simmer routine which directs the flashlamp to supply less than minimal lasing power to the gain medium.

30. The laser of claim 29, wherein the supplying means includes a simmer routine which directs the flashlamp to supply less than minimal lasing power to the gain medium.

31. The laser of claim 26, wherein the supplying means includes a ramp routine comprising a series of flashes of substantially constant frequency and gradually increasing intensity.

32. A laser comprising:
a solid gain medium which forms a stable thermal lens when heated to a normal operating state;
first power means for supplying the gain medium with sufficient power to form the thermal lens yet insufficient to cause substantial emission of laser light;
second power means for supplying the gain medium with sufficient power to cause substantial emission of laser light; and
control means for cooperatively driving the first and second power means to heat the gain medium so as to substantially form the thermal lens prior to generating substantial laser light.

33. The device of claim 32, wherein each power means is a separate flashlamp.

* * * * *